United States Patent [19]
Frentzel

[11] Patent Number: 4,729,406
[45] Date of Patent: * Mar. 8, 1988

[54] AUTOMATIC VALVE FOR USE WITH POOL CLEANING DEVICES

[75] Inventor: Herman E. Frentzel, Kentfield, Calif.

[73] Assignee: Arneson Products, Inc., Corte Madera, Calif.

[*] Notice: The portion of the term of this patent subsequent to Feb. 17, 2004 has been disclaimed.

[21] Appl. No.: 933,974

[22] Filed: Nov. 24, 1986

Related U.S. Application Data

[62] Division of Ser. No. 737,521, May 24, 1985, Pat. No. 4,643,217.

[51] Int. Cl.⁴ .................................................. G05D 11/00
[52] U.S. Cl. .................................. 137/624.14; 137/112; 137/119; 251/230
[58] Field of Search ............................. 137/111–114, 137/624.14, 119; 251/230, 252–256; 134/166 R, 167 R; 239/438, 570–572

[56] References Cited

U.S. PATENT DOCUMENTS

| | | | |
|---|---|---|---|
| 3,018,788 | 1/1962 | Perlis | 137/627 |
| 3,147,770 | 9/1964 | Perlis | 137/624.13 |
| 3,275,247 | 9/1966 | Hammelmann | 239/570 |
| 3,291,145 | 12/1966 | Arneson | 15/1.7 |
| 3,780,980 | 12/1973 | Kallel | 251/252 |
| 3,853,145 | 12/1974 | Judd | 137/624.18 |
| 3,941,154 | 3/1976 | Bishop | 137/624.15 |
| 4,029,119 | 6/1977 | Klieves | 137/624.14 |
| 4,109,670 | 8/1978 | Slagel | 137/624.14 |
| 4,116,216 | 9/1978 | Rosenberg | 137/624.13 |
| 4,434,519 | 3/1984 | Raubenheimer | 15/1.7 |
| 4,441,523 | 4/1984 | Stoll | 137/624.18 |
| 4,488,476 | 12/1984 | Diel | 91/513 |
| 4,526,186 | 7/1985 | Frentzel | 134/167 R |
| 4,643,217 | 2/1987 | Frentzel | 137/112 |

Primary Examiner—Robert G. Nilson
Attorney, Agent, or Firm—Limbach, Limbach & Sutton

[57] ABSTRACT

An automatic valve is disclosed for controlling the direction of fluid flow. The valve is particularly suited for use with automatic pool cleaning systems to alternately direct fluid flow to the filtration system of an automatic pool cleaner. The valve includes a primary conduit and a branch segment to define an alternate path for fluid flow. A reciprocating piston is mounted within the branch segment. Indexing is provided by a first cammed surface, formed at one end of the piston which includes a plurality of slots. The slots are selectively engaged with a stop pin. The condition of the valve is determined by the length of the particular slot engaged with the stop pin. A spring is provided for biasing the piston out of engagement with the stop pin when the fluid flow is interrupted. In one embodiment of the subject valve, the volume and pressure of the fluid flow are automatically controlled.

8 Claims, 10 Drawing Figures

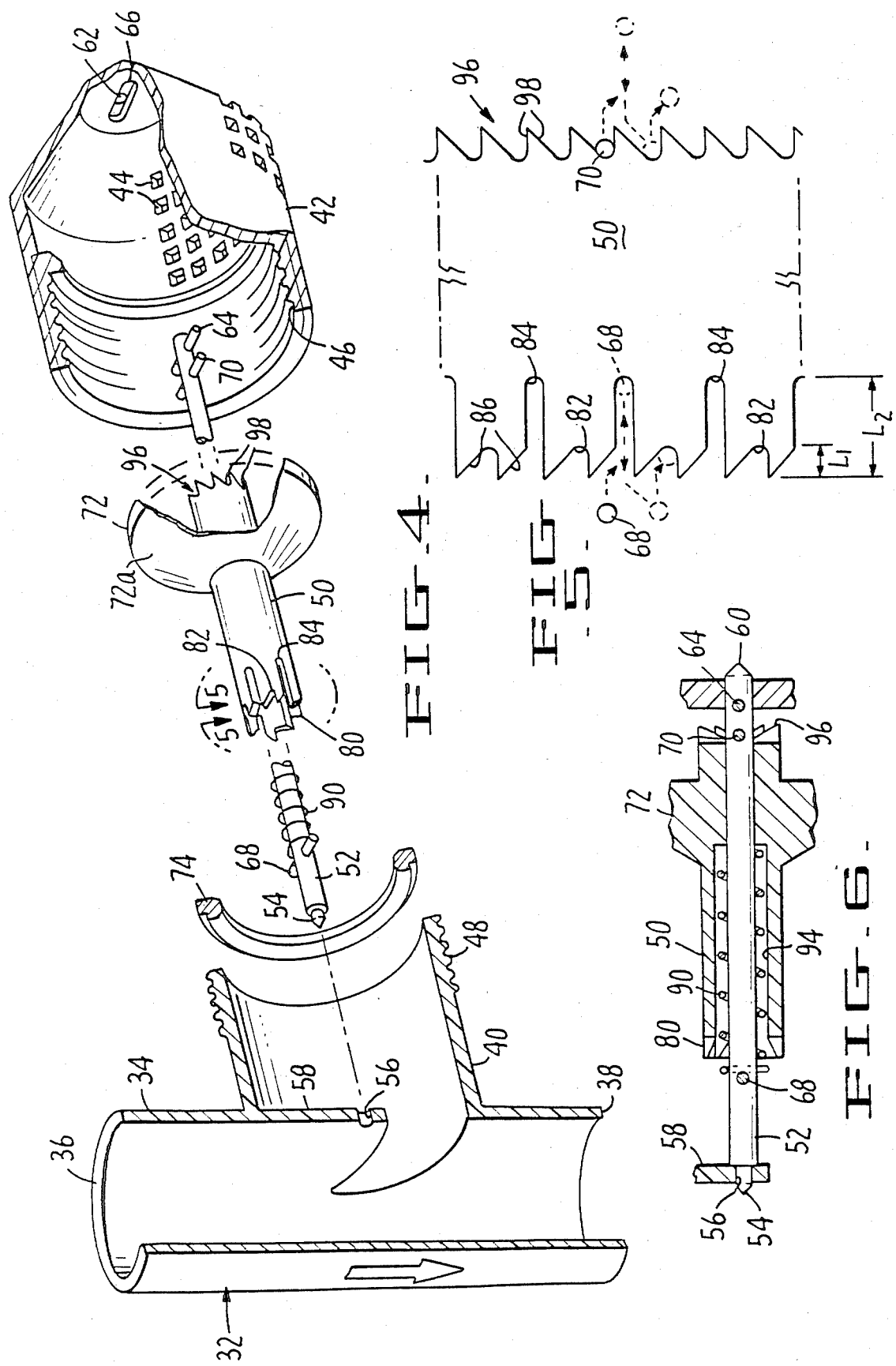

AUTOMATIC VALVE FOR USE WITH POOL CLEANING DEVICES

This is a division of application Ser. No. 737,521, filed May 24, 1985, now U.S. Pat. No. 4,643, 217.

TECHNICAL FIELD

The subject invention relates to an automatic valve for controlling the direction of fluid flow. The valve is particularly adapted for use with automatic swimming pool cleaners.

BACKGROUND OF THE INVENTION

Over the years, considerable attention has been given to systems for cleaning swimming pools. In most larger swimming pools, a circulation system is provided for filtering the water. The circulation system includes a surface water skimmer and a main drain which are in communication with a suction pump at the filter station. The pump draws off water from the pool for processing. The purified water is returned to the pool through a pressurized outlet. While the water is out of the pool, it can also be heated.

Particulates which are drawn in with the water through the main drain are collected at the filter. Surface debris is collected in the skimmer. While this approach removes a significant amount of dirt from a pool, additional steps must be taken to maintain a clean pool.

For example, manual cleaning systems are used to permit the pool owner to vacuum the pool. These manual systems, however, require a significant amount of time each week to maintain the cleanliness of the pool. Therefore, various automatic cleaning systems have been developed.

One type of automated system, which can be termed a water jet system, uses a buoyant power head connected to a water pressure source. One such pool cleaner, disclosed in U.S. Pat. No. 3,291,145 to Arneson Products, Inc., includes a pair of flexible hoses extending downwardly from a programed buoyant power head. The hoses have nozzles through which high pressure water streams are ejected. As the buoyant power head moves about the surface of the pool, the cleaner hoses sweep the dirt film from the bottom and the sides of the pool and the debris from the bottom of the pool towards the main drain at the pool's lower end. Waterlogged leaves and large debris collected in one place can then be removed from the pool. Floating leaves and other material are driven to the edge of the pool where they are removed by the pool skimmer. The device in the latter patent utilizes an additional high power pressure pump to deliver approximately 50 pounds per square inch of pressure. Where energy costs are significant, the need for an additional pressure pump was found undesirable.

Accordingly, there has been developed another automatic pool cleaner which operates on a lower pressure system. In fact, it is designed to operate off the outward fluid flow generated by the standard pool circulation system. The latter device uses a manifold to further pressurize the water from within the device itself. The details of the latter device are described in detail in copending application, Ser. No. 541,193, filed Oct. 12, 1983, and now U.S. Pat. No. 4,526,186, the disclosure of which is incorporated herein by reference. A device of the type disclosed in the latter patent is marketed by Arneson Products, Inc. under the TURBO SWEEP trademark.

As disclosed in the latter application, a restrictor valve is utilized to build up back pressure sufficient to power the device. Specifically, the water pressure of a typical filter pump will be at 8-12 P.S.I. The valve is used to boost the pressure to about 16-22 P.S.I. The valve is also used to direct any excess flow to the pool return. The amount of flow directed to the return would depend on the back pressure which can be generated by the combination of the pump and the restriction in the valve. In practice, when the filter is clean, pressures in the 22 P.S.I range, can easily be generated and supplied to the pool cleaner. In this case, a significant portion of the fluid flow will be directed by the valve to the pool return. As the filter becomes clogged, the pressure which can be generated is reduced, such that the flow to the pool return must be further reduced in order to maintain proper operating pressure for the pool cleaner.

The restrictor valve can be defined by a simple device which is manually adjusted to ensure that the proper pressure delivered to the pool cleaner. The latter patent application disclosed another valve which is automatically adjustable, through an internal ball check valve, to control the pressure to the pool cleaner.

One of the problems with these director valves is that they restrict fluid flow in order to increase pressure. This restriction, which can reduce flow from 40 gallons per minute down to 15 gallons per minute, results in the drastic increase in the time it takes to circulate and filter all the water in the pool. To maximize the filtering operation, the flow of fluid to the pool return should be unrestricted. To insure that debris is swept from the pool, both the pool cleaner and the filter system need to be operated. It would be desirable to provide a valve which can satisfy both these objects. It would also be desirable to provide a valve which automatically adjusted the pressure delivered to the pool cleaner.

The pool cleaning devices discussed above all operate on a water pressure supply. Recently, there have been developed other automatic pool cleaning systems that rely on suction. One such device is disclosed in U.S. Pat. No. 4,434,519 to Raubenheimer, issued Mar. 6, 1984, the disclosure of which is incorporated herein by reference. A device made in accordance with the teachings of the latter patent is marketed by Aquanaut, Inc., under the trademark POOL VAC.

The latter device consists of a housing to which a vacuum hose is connected. The other end of the vacuum hose is connected to the vacuum source at the skimmer of the pool. The suction of the water through the device causes an internal turbine to rotate. The turbine is operatively connected to a pair of rocking feet or pods, enabling the device to move around the bottom and sidewall surfaces of the pool. Dirt and other debris are drawn into the device and carried by the suction hose into the skimmer of the pool.

The latter device provides a very effective means for cleaning the surfaces of the pool. Unfortunately, because the hose is connected to the skimmer outlet, the skimmer is disabled. Therefore, the efficiency of removal of debris from the upper surface of the pool is reduced. Pool owners are required to manually connect and disconnect the suction hose to the cleaner to permit the alternate operation of either the skimmer or the automatic pool cleaner. It would be desirable to provide the pool owner with a valve that automatically switched functions between the pool skimmer and vacuum pool cleaner.

In most pool cleaning systems, a timer is utilized to intermittently actuate the filter pumps. For example, the filter system may be turned on to operate for a few hours in the early morning and late evening. Thus, a valve which was responsive to changes in fluid flow would be suitable for use in the subject system.

In the prior art, a number of automatic cycling valves have been developed. For example, U.S. Pat. Nos. 3,018,788 and 3,147,770 to Perlis, and U.S. Pat. No. 4,116,216 to Rosenberg, all disclose automatic valves which index upon an interruption or reduction of fluid flow. Unfortunately, the valves disclosed in the above cited patents are relatively complex and utilize an internal piston that is intricate and difficult to manufacture. Furthermore, these valves are not designed to operate under low negative pressure (suction) conditions. Accordingly, it would be desirable to provide an automatic valve which was simpler in construction and could be manufactured at lower cost.

Therefore, it is an object of the subject invention to provide a new and improved automatic valve.

It is another object of the subject invention to provide a new and improved valve for automatically controlling the direction of fluid flow.

It is a further object of the subject invention to provide a new and improved automatic valve which is indexable.

It is still another object of the subject invention to provide a new and improved valve which is indexable based on the intermittent flow of fluid.

It is still a further object of the subject invention to provide an automatic valve for use with automatic pool cleaning systems.

It is still another object of the subject invention to provide a new and improved valve for use with automatic pool cleaning systems based on suction.

It is still a further object of the subject invention to provide a new and improved automatic valve for use with pool cleaners that utilize fluid pressure.

It is still another object of the subject invention to provide a new and improved valve which can automatically regulate the pressure delivered to a pool cleaner.

SUMMARY OF THE INVENTION

In accordance with the subject invention, a pair of valve structures are disclosed which are adapted for automatic operation in both suction and pressure situations. Both of the valves include a primary conduit for channeling fluid flow. A branch segment is provided which is in communication with the primary conduit to define an alternate path for fluid flow. Each of the valves includes a piston mounted for reciprocal movement between first, second and third positions. The piston also carries a sealing means configured to restrict the fluid flow in the branch segment when the piston is in the first position and to permit fluid flow through the branch segment when the piston is in the second position.

In contrast to the complex systems of the prior art, the subject piston is solid, having no sawtooth cut-outs that would disrupt its structural integrity. In order to provide the automatic indexing function, a first cammed surface is provided at one end of the piston. The cammed surface includes a plurality of slots of different lengths. A stop pin is provided which is receivable in the slots when the piston is in one of the first or second positions. The length of the slot will govern which of the first or second positions the piston is placed.

A spring is provided for urging the piston towards a third position, disengaging the pin from the slots, when the fluid flow is lessened or interrupted. As noted above, this situation occurs in the normal cycling of a pool system. When the water flow is reestablished, the piston will move towards the first and second positions. In accordance with the subject invention, the cammed surface on the piston is configured such that the pin will become engaged in the next successive slot, thereby indexing the valve. In order to enhance the indexing function, a second cammed surface is provided at the other end of the piston. This second cammed surface includes slots offset from the slots in the first surface. The cammed surface is also configured to rotate the piston as it is indexed.

In one of the preferred embodiments, the valve is configured to provide constant pressure to a pool cleaner.

Further objects and advantages of the subject invention will become apparent from the following detailed description taken in conjunction with the drawings in which:

BRIEF DESCRIPTION OF THE DRAWINGS

FIG. 4 is an exploded perspective view illustrating the components forming the valve of the first embodiment of the subject invention.

FIG. 5 is a developmental view of the cam arrangement taken about the lines 5—5 in FIG. 4.

FIG. 6 is a partial cross-sectional view of the piston, illustrating the reciprocal mounting arrangement.

DETAILED DESCRIPTION OF THE PREFERRED EMBODIMENTS

Figure 1:
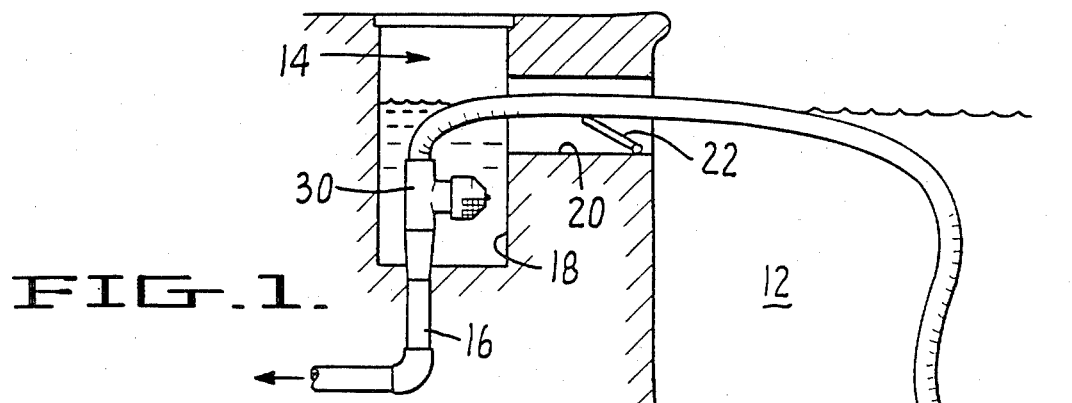
FIG. 1 is a schematic diagram illustrating the position of the valve of the subject invention with respect to an automatic pool cleaner.

Turning to FIG. 1, there is illustrated a partial view of a pool 10 filled with water 12. The side of the pool, including a skimmer 14 is shown. The skimmer includes a pipe 16 which is in communication with a chamber 18. Line 16 is connected to the suction end of the filter system. Chamber 18 includes a side branch 20 in communication with the pool. A weir or flapper valve 22 is provided to prevent floating debris, captured by the skimmer, from returning to the pool. When an automatic pool cleaner is not used, water is drawn off through the branch 20 into the chamber 18 and out through pipe 16.

In the illustrated embodiment, an automatic pool cleaner 24 is illustrated. The pool cleaner, which operates on suction, is of the type described in U.S. Pat. No. 4,434,519 marketed under the POOL VAC trademark by Aquanaut, Inc.. A hose 26 is connected to the upper end of the pool cleaner 24. The other end of the hose is connected directly to the pipe 16. Unfortunately, when this connection is made, the skimmer becomes disabled since all the suction is channeled to the cleaner 24. This difficulty is overcome in the subject invention by interposing a valve 30 between the pipe 16 and hose 26. The structure and operation of the valve will now be discussed with reference to FIGS. 2 through 6.

Valve 30 consists of a main body 32 having a vertically oriented primary conduit 34. In the illustrated embodiment, water is drawn through the primary conduit from hose 26 and pool cleaner 24. Primary conduit 34 has an inlet 36 and an outlet 38. Outlet 38 is connectable to the suction line 16. Preferably, the ends of the conduit are tapered as shown to facilitate installation.

The main body 32 further includes a branch segment 40. The branch segment provides an alternate path for fluid flow. In the illustrated embodiment, the branch segment includes a removable cap 42 having openings 44 to permit the inflow of fluid. Cap 42 is provided with threads 46 which, during assembly, mate with threads 48 on the portion of the branch formed integrally with the main body of the valve.

In accordance with the subject invention, the valve further includes a piston 50 which is mounted for reciprocal movement within the branch segment. Piston 50 is mounted on a central rod 52. In the illustrated embodiment, one end 54 of rod 52 is received within an aperture 56 formed in a wall extension 58 of the main body. The opposed end 60 of the rod is received in an aperture 62 in cap 42. Rod 52 is also provided with a pin 64 which is receivable in a recess 66 formed in the cap. The interengagement between the pin 64 and the recess 66 prevents the rod from rotating. Rod 52 is also provided with a pair of stop pins 68 and 70, located at the opposed ends thereof. The operation of the stop pins will become apparent below.

Figure 2:
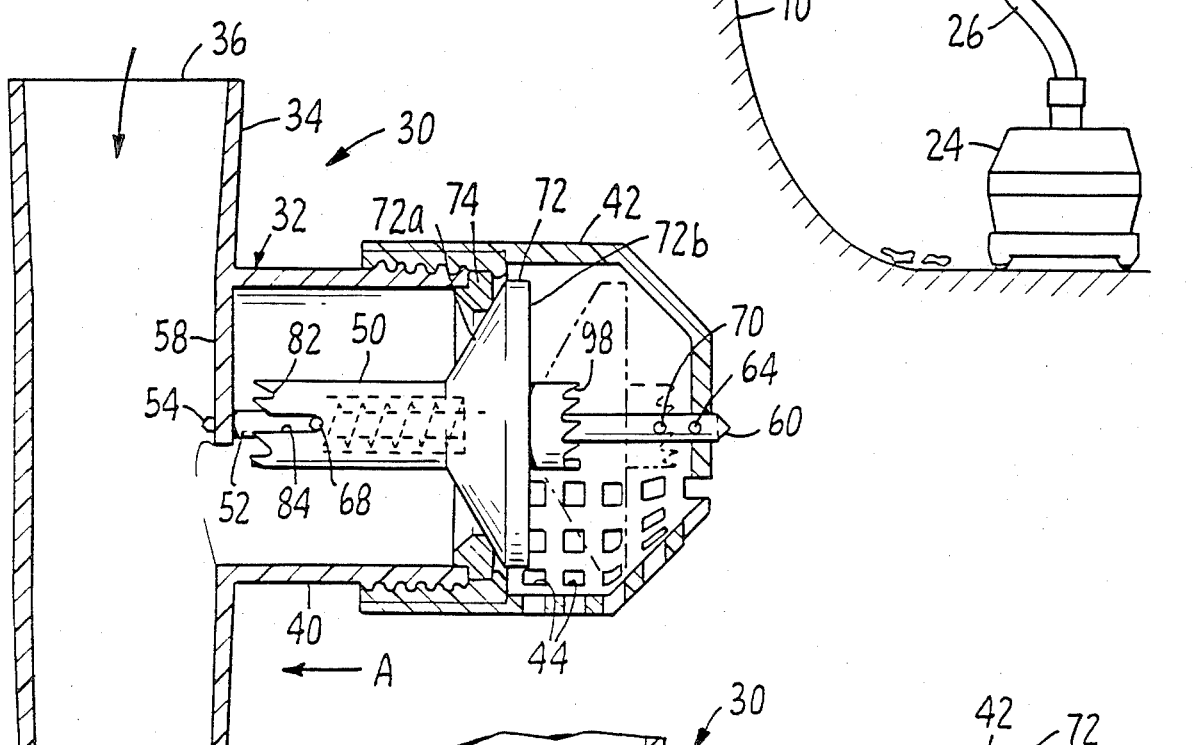
FIG. 2 is a cross-sectional view of the first embodiment of the valve of the subject invention, adapted for use with a suction system, shown with the piston in the closed position

In accordance with the subject invention, piston 50 includes a means for restricting the fluid flow through the branch segment. In the illustrated embodiment, this means is defined by a conically shaped, radially projecting body 72. One surface 72a of body 72 is designed such that when the piston is moved to the closed position, as shown in FIG. 2, fluid flow through the branch segment 40 will be restricted. In order to further enhance the sealing, a radially inwardly projecting shelf can be provided with a configuration complementary to the surface 72a. The cooperation between the surface 72a and shelf 74 aids in shutting off the flow through the branch. It should be understood that in operation, complete sealing is not required, and it would only be necessary to substantially restrict the flow in order to allow the pool cleaning device 24 to operate.

The opposed surface 72b of body 72 is configured to define a bearing surface upon which the flow of water will impinge. The force of the water flow on body 72 will tend to move the piston in the direction of arrow A in FIG. 2, as discussed below.

Figure 3:
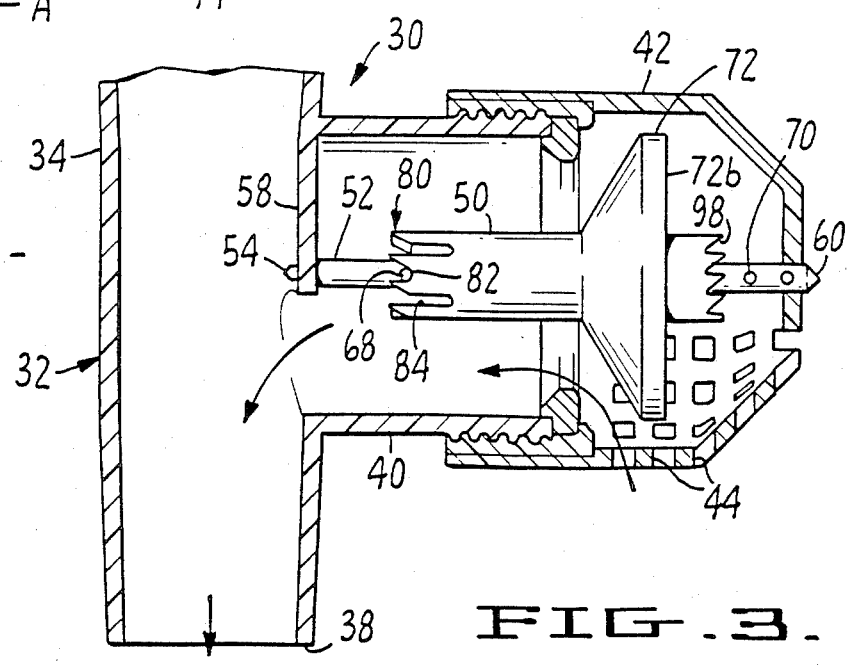
FIG. 3 is a cross-sectional view similar to FIG. 2 with the piston shown in the open position.

In accordance with the subject invention, a means is provided for indexing the valve between the closed and opened postions shown respectively in FIGS. 2 and 3. This means includes a first cammed surface 80 formed on one end of the piston 50. The cammed surface 80 is provided with a plurality of slots 82 and 84 of different lengths. The cammed surface also includes angled portions 86, best seen in FIG. 5, for rotating the piston and guiding the pin into the slots.

As pointed out above, the cammed surface 80 includes a plurality of slots 82 and 84. In the preferred embodiment, slots 82 have a length $L_1$ and are located in every other position about the cammed surface. Slots 84 are interposed between the slots 82 and have a length $L_2$ significantly longer than the length $L_1$. The different lengths of the slots are used to define two of the positions of the valve. More specifically, and as shown in FIG. 2, as fluid is drawn through the valve by the suction carried along pipe 16, piston 50 will tend to be forced toward the left, in the direction of arrow A in FIG. 2, such that the pin is engaged in one of the slots. This motion will continue until the pin reaches the end of the slot with which it is aligned. If the pin is aligned with one of the longer slots 84, as shown in FIG. 2, the piston will move fully to the left, sealing the branch segment. In this case, all fluid will pass through the main conduit and to the automatic pool cleaner 24.

In contrast, if the pin is aligned with one of the shorter slots 82, as shown in FIG. 3, the movement of the piston will be arrested before it is moved far enough to seal off the branch segment. In this case, fluid flow will be drawn through the openings 44 in cap 42. As seen in FIG. 1, suction through openings 44 is communicated to the reservoir 18, enabling the skimmer to function. While the main conduit is also unobstructed in this orientation, most of the fluid will be drawn through the skimmer because of the resistance the flow would encounter throughout the length of the long hose connected to the pool cleaner 24.

As discussed above, pool filter systems are run intermittently, using a timer. Thus, the fluid flow is periodically halted. The indexing function of the subject valve is based upon this periodic reduction in fluid flow. The indexing is facilitated by the provision of a spring 90 mounted about the central rod and fitted within a recess 94 in the piston. Spring 90 provides a force which tends to push the piston in a direction, opposite to arrow A, in FIG. 2. The strength of the spring is designed such that it will be insufficient to overcome the force of the fluid flowing through the valve. When suction is used to operate a pool cleaner, the forces provided by the fluid are relatively small, such that spring 90 must be small.

As noted above, when the pump is operating, the fluid flow will impinge on the surface 72b of body 72, forcing the piston towards the main conduit. In addition, fluid flowing around body 72 and through the restricted area defined by the adjacent wall will create a venturi effect and a pressure differential, that will also tend to drive the piston in the direction of arrow A. When the fluid flow is halted, spring 90 has sufficient strength to move the piston to a position, shown in phantom in FIG. 2, where pin 68 is disengaged from the slots 80. When the flow of fluid is restarted by the timer in the cleaning system, the piston will be driven back, such that the pin is engaged with the next successive slot. The angled configuration 86 of the cammed surface 80 is designed to impart a slight rotation to the valve each time it is operated.

In order to ensure that the valve rotates and indexes properly, it is desirable to provide a second cammed surface 96 at the opposed end of the piston 50. Cammed surface 96 includes a plurality of slots 98 of equal depth. Similar to the design of the cammed surface 80, cammed surface 96 has a plurality of angled portions to facilitate the indexing of the piston. More importantly, the slots 98 of the cammed surface 96 are offset from the slots 82 and 84 of cammed surface 80.

In operation, when the fluid flow is halted, spring 90 will tend to move the piston, disengaging pin 68 from slots 82 and 84 and engaging pin 70 with slots 98 as shown in phantom in FIG. 2. Because the slots of the two cammed surfaces are offset, the reciprocating motion of the piston during operation will produce a positive indexing function. The piston will rotate in a counterclockwise direction as shown by arrow B in FIG. 4.

In the illustrated embodiment, cammed surface 80 is provided with alternating slots 82 and 84. By this arrangement, upon each actuation of the filter system, the suction force will be alternately directed to the skimmer and the pool cleaner. It should be understood that any other sequence can be programmed into the valve by structuring the depth of the slots in the cammed surface 80. Thus, if one wanted to operate the pool cleaner 24 twice as often as the skimmer, one would double the number of longer slots 84 as compared to the shorter slots 82 on the cammed surface 80.

Turning now to FIGS. 7 through 10, the second embodiment of the valve 130 of the subject invention is illustrated. This valve is intended to be used where the pool cleaning device is operated on pressure such as the one described in U.S. Ser. No. 541,193, filed Oct. 12, 1983 and now U.S. Pat. No. 4,526,186, cited above. This valve would typically be located in the pump station remote from the pool.

Figure 10:
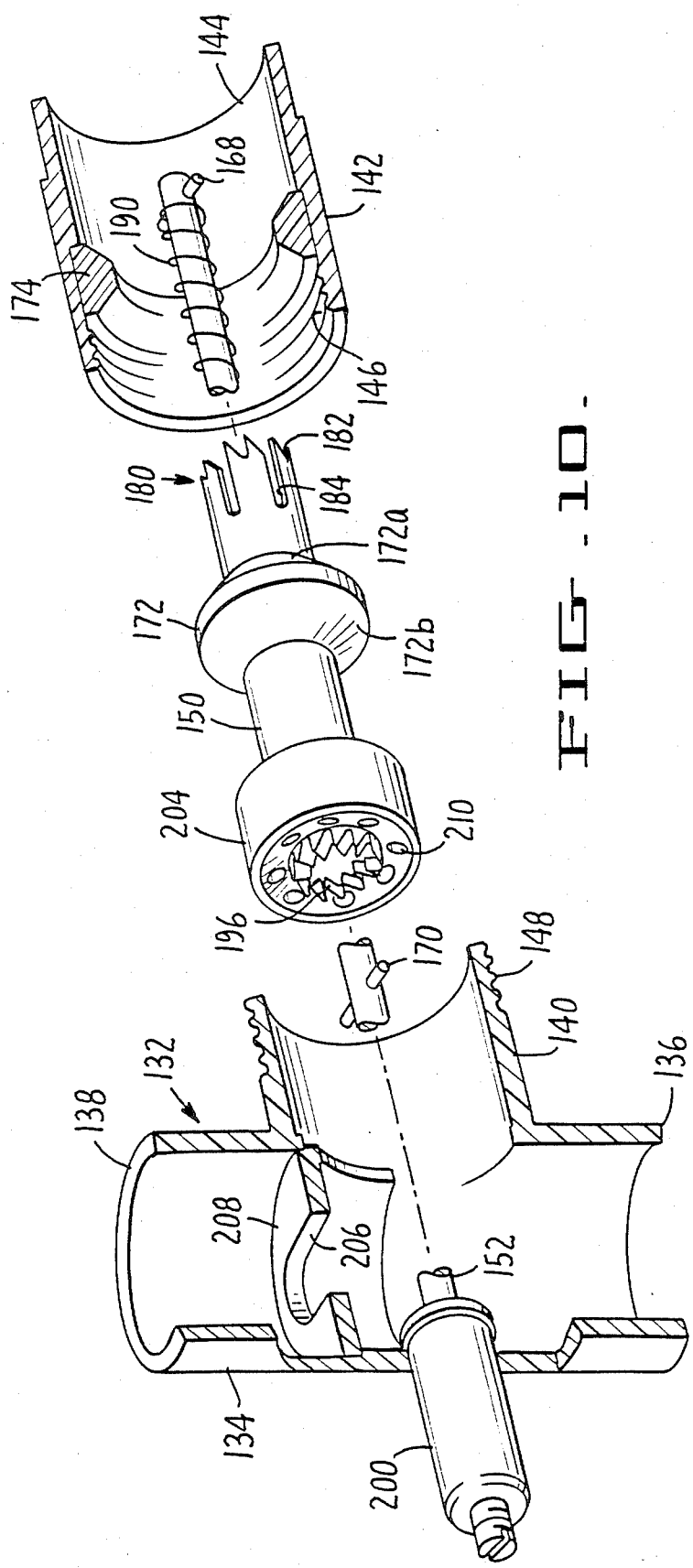
FIG. 10 is an exploded perspective view of the second embodiment of the valve of the subject invention.

As illustrated in FIG. 10, valve 130 includes a main body 132 having a primary conduit 134. Fluid is forced through the primary conduit from the inlet end 136 to outlet 138. The main body 132 further includes a branch segment 140 defining an alternate path of fluid flow. The branch segment 140 is connectable to an extension section 142. Fluid flowing out from extension section 142 is directed, through open end 144, to a pool cleaning apparatus (not shown) that operates under pressure. Extension section 142 is provided with threads 146 for engagement with the threads 148 of the branch segment 140.

In accordance with the subject invention, a piston 150 is provided that is mounted on a central rod 152. A cylindrical housing 200 is mounted to the body 132 and has an interior channel 201 for receiving one end 152 of central rod 150. An O-ring 202 is provided for sealing. The end 152 of rod 150 is threaded at 203 to permit the initial adjustment of the location of piston 150. Center rod 152 is provided with a pair of stop pins 168 and 170 performing a function similar to that discussed above with relation to the first embodiment.

Figure 7:
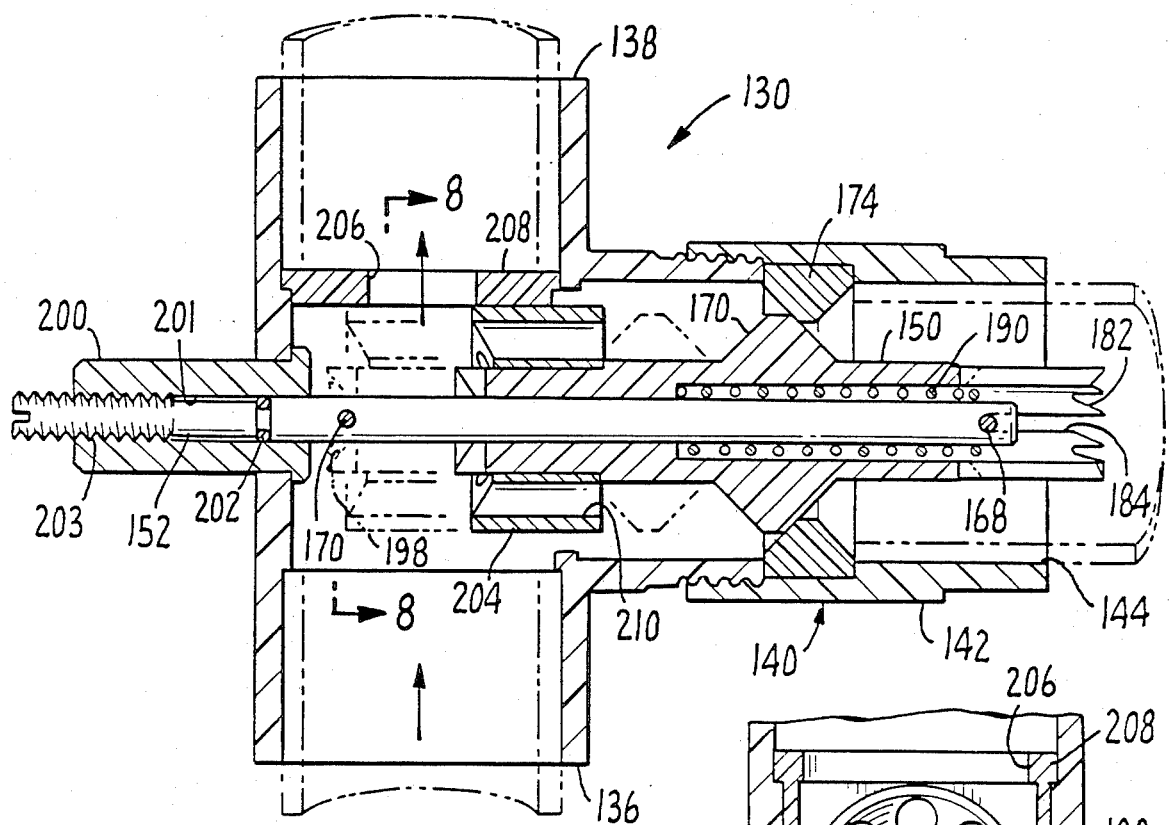
FIG. 7 is a cross-sectional view of an alternate embodiment of the valve of the subject invention for use with a water pressure system.
Figure 8:
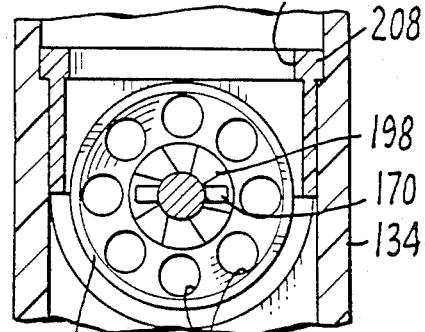
FIG. 8 is a cross-sectional view of the second embodiment of the valve taken along the line 8—8 in FIG. 7.

Piston 150 includes a body 172 having a surface 172a configured to restrict the fluid flow in branch segment 140. In the preferred embodiment, extension section 142 includes a radially inwardly projecting shelf 174 which cooperates with surface 172a of piston 150. As illustrated in FIG. 7, when the valve is in the closed position, surface 172a of body 172 abuts surface 174 such that all the fluid flows through the main branch. As in the first embodiment, the opposed surface 172b of body 172 is configured to define a bearing surface and direct the fluid flow to help drive the piston when filter is in operation.

Figure 9:
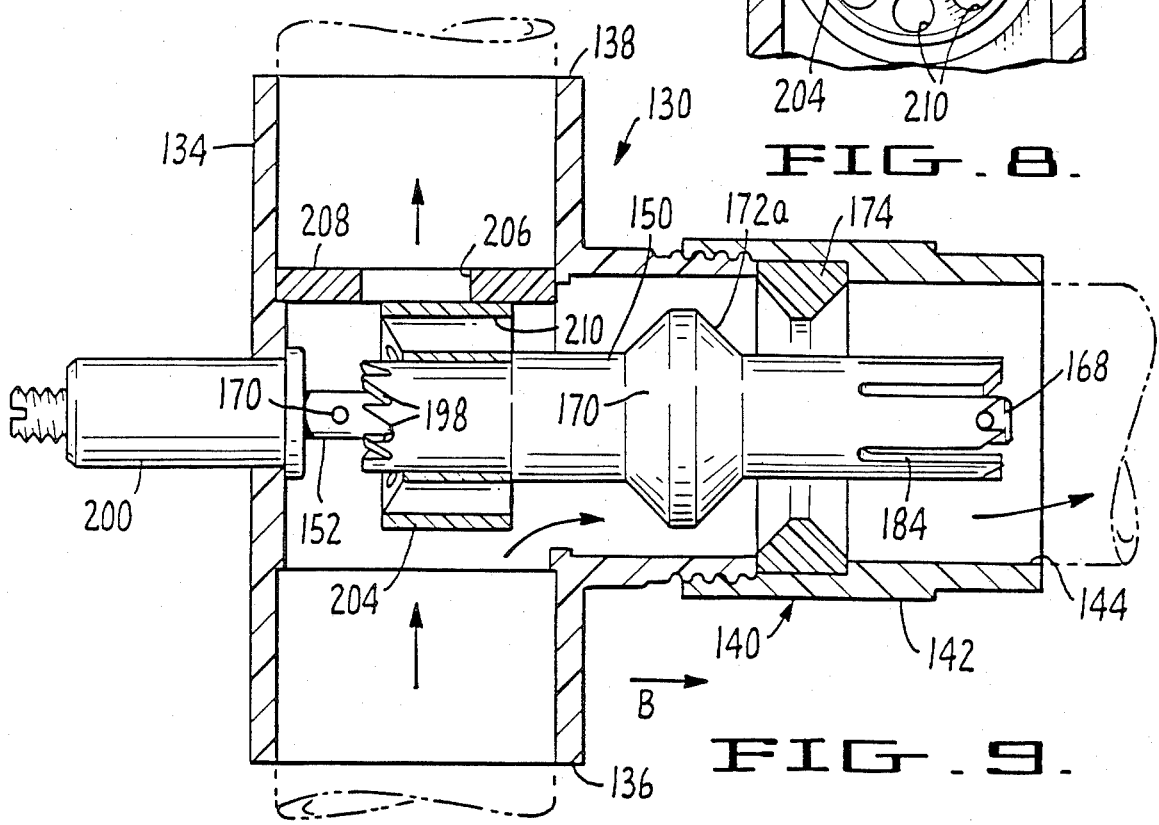
FIG. 9 is a cross-sectional view similar to FIG. 7, illustrating the piston in the open position.

When the valve is in the open position as shown in FIG. 9, fluid will flow around surface 172 and out extension section 142. In order to provide sufficient back pressure to boost the pressure delivered to pool cleaner to approximately 16–22 P.S.I., it is desirable to restrict a portion of the flow out of the main conduit 134. As noted above, as the filter becomes clogged, the pressure generated by the pump will be reduced. Therefore, it is also desirable to automatically adjust the amount of fluid permitted to pass through the main conduit, such that a constant pressure can be supplied to the pool cleaner.

These results are achieved by providing a second sealing surface 204 on piston 150. The sealing surface includes a cylindrical barrier which cooperates with an opening 206 formed in a flow-restricting element 208. As seen in FIG. 7, when the valve is in the closed position, opening 206 is unobstructed. In this case, the filter system will deliver all the flow to pool return with no restriction. When the piston is moved to the position shown in FIG. 9 and the branch segment is opened, member 204 partially obstructs opening 206. This obstruction reduces the flow of fluid and creates back pressure thereby providing sufficient force to operate the pool cleaner. Body 204 is provided with a plurality of channels 210 to enhance fluid flow through branch segment 142.

As the filter system operates, it will become clogged, such that the back pressure will tend to drop. In order to counteract this pressure drop, a relatively strong spring 190 is provided to bias the piston in a direction opposite to arrow C in FIG. 9. As compared to a suction-type cleaner (where the pressure differential is small), a pressure-type cleaner operates at a higher relative differential, permitting the use of a stronger spring. Where a strong spring is used, pressures can be controlled. As can be appreciated, as the force supplied by the pump is reduced (when the filter is clogged), spring 190 will force the piston to the left and surface 204 will more fully obstruct aperture 206 such that back pressure to the pool cleaner will be maintained at a constant level. Similarly, when the filter is cleaned, and the pump pressure increases, the piston will be driven to the right, opening aperture 206 and allowing more of the fluid to flow directly to the pool return.

The initial pressure setting can be controlled by setting the amount that surface 204 obstructs opening 206. This setting is made by adjusting the throw of the central rod 152 by rotating the rod about threads 203. When the system is initialized, a pressure gauge can be used to monitor the flow leaving the branch segment 142.

In accordance with the subject invention, a means is also provided for permitting the automatic indexing of the valve during operation. The means for providing this function includes a first cammed surface 180 including a plurality of slots 182 and 184. As in the first embodiment, the slots are of different depths. When fluid pressure is actuated, the piston 150 is driven to the right, in the direction of arrow C in FIG. 9, until pin 168 is engaged with one of the slots of cammed surface 180. As with the first embodiment, the position of the piston will be dependent upon the length of the slot in which the pin is engaged. More specifically, and as shown in FIG. 9, if the pin is engaged in one of the shorter slots 182, the valve will be open. In contrast, and as shown in FIG. 7, if the pin is engaged in one of the longer slots 184, the mating surfaces 172 and 174 will function to seal off the branch segment such that the fluid flow will be directed through the main conduit 134.

As discussed above, the pool filter system is activated on an intermittent basis. Thus, the fluid flow will periodically be shut down. When there is no fluid flow past piston 150, a spring 190 will function to drive the piston in a direction opposite to arrow C, thereby disengaging the pin 168 from slots 180. When the water pressure is reestablished, hack pressure will build up until piston 150 is driven to the right, such that pin 168 engages one of the slots of the cammed surface 180. The cammed surfaces are configured to cause the piston to rotate in a counterclockwise direction, as illustrated in FIG. 10.

This rotation or indexing is facilitated by providing a second cammed surface 196 on the opposed end of the piston. The second cammed surface 196 includes a plurality of slots 198 within which pin 170 is received. Similar to the first embodiment, slots 198 are offset from slots 182 and 184 of cammed surface 180 to enhance the rotation of the piston. As can be appreciated, once the fluid flow is restarted, and back pressure builds, a slot 198 of cammed surface 196 will be driven out of engagement with pin 170 and pin 168 is engaged with cammed surface 180. The direction of fluid flow through the valve is, of course, dependent upon which of the slots 182, 184 are engaged with pin 168.

In summary, there have been provided two new valves that function to automatically control the flow of fluid. The valves are designed to permit the operation of a water powered pool cleaner on an intermittent basis. The valves take advantage of the fact that the operation of the pool cleaning system is typically on a timer, providing intermittent flow. The intermittent flow is used to actuate the valve, alternatively directing the fluid flow to either the automatic pool cleaner and/or filtration system. The valve design is compact, simple and avoids the necessity of forming complex components as found in the prior art.

While the subject invention has been described with reference to preferred embodiments, it is to be understood that various changes and modifications could be made therein by one skilled in the art, without varying from the scope and spirit of the subject invention as defined by the appended claims.

I claim:

1. An automatic valve for restricting fluid flow though an orific comprising:
   a central rod aligned with and passing through said orifice;
   support means for maintaining the position of said central rod with respect to said orifice;
   a piston journalled about said central rod and mounted for reciprocal movement between first, second and third positions along the length of said rod, said piston carrying a sealing means configured to restrict fluid flow through said orifice when the piston is in the first position and to permit fluid flow through said orifice when the piston is in the second position; and
   means for providing automatic indexing of said piston between and first and second positions in response to the nonuniform flow of fluid, said means including a first cammed surface at one end of said piston and formed integrally therewith, said cammed surface including a plurality of slots, said means further including a stop pin receivable in one of said slots when the piston is in one of the first or second positions, with the selection of said first and second positions being governed by the length of the particular slot within which the pin is presently engaged, said means further including a biasing member for urging the piston towards said third position when the fluid flow is lessened thereby disengaging the pin from a slot, and with said cammed surface being configured such that when the fluid flow is increased and the piston moves towards said first and second postions, the pin will become engaged with the next successive slot.

2. An automatic valve as recited in claim 1 wherein said means for indexing further includes a second cammed surface located the other end of said piston, said second cammed surface having slots offset from the slots in said first surface, said indexing means further including a second stop pin arranged to engage with one of the slots in the second cammed surface when said pistion means is in the third position.

3. An automatic valve as recited in claim 2 wherein the cammed surfaces include angle portions to facilitate the rotation of the piston.

4. An automatic valve as recited in claim 1 wherein said stop pin is formed intergrally with said central rod.

5. An automatic valve as recited in claim 1 where every other slot on said first cammed surface is of a first length and the remaining slots are of a second, longer length.

6. An automatic valve as recited in claim 1 wherein said sealing means of said piston includes a conically shaped surface.

7. An automatic valve as recited in claim 1 further including a means for adjusting the position of the central rod with respect to the orifice to vary the location of the piston with respect to the orifice.

8. An automatic valve as recited in claim 1 wherein said piston further includes a bearing surface upon which the flow of fluid will cause the piston to move from said third positon towards one of said first and second positions.

* * * * *

UNITED STATES PATENT AND TRADEMARK OFFICE
CERTIFICATE OF CORRECTION

PATENT NO. : 4,729,406
DATED : March 8, 1988
INVENTOR(S) : Herman E. Frentzel

It is certified that error appears in the above - identified patent and that said Letters Patent is hereby corrected as shown below:

In the Claims

Claim 4 is corrected to read as follows:

4. An automatic valve as recited in claim 1 wherein said stop pin is formed integrally with said central rod.

Signed and Sealed this

Twelfth Day of July, 1988

Attest:

DONALD J. QUIGG

Attesting Officer

Commissioner of Patents and Trademarks